US012090411B2

(12) United States Patent
Ohno et al.

(10) Patent No.: US 12,090,411 B2
(45) Date of Patent: Sep. 17, 2024

(54) INFORMATION PROCESSING SYSTEM AND INFORMATION PROCESSING DEVICE

(71) Applicant: Sony Interactive Entertainment Inc., Tokyo (JP)

(72) Inventors: Erika Ohno, Tokyo (JP); Daisuke Kawamura, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 374 days.

(21) Appl. No.: 17/422,866

(22) PCT Filed: Jan. 16, 2020

(86) PCT No.: PCT/JP2020/001344
§ 371 (c)(1),
(2) Date: Jul. 14, 2021

(87) PCT Pub. No.: WO2020/153231
PCT Pub. Date: Jul. 30, 2020

(65) Prior Publication Data
US 2022/0096942 A1 Mar. 31, 2022

(30) Foreign Application Priority Data

Jan. 24, 2019 (JP) ................. 2019-010545

(51) Int. Cl.
*A63F 13/87* (2014.01)
*A63F 13/533* (2014.01)

(52) U.S. Cl.
CPC ............ *A63F 13/87* (2014.09); *A63F 13/533* (2014.09)

(58) Field of Classification Search
CPC ................................ A63F 13/87; A63F 13/533
USPC ........................................................ 463/42
See application file for complete search history.

(56) References Cited

U.S. PATENT DOCUMENTS

| 7,311,608 | B1* | 12/2007 | Danieli | A63F 13/795 |
| | | | | 463/42 |
| 7,917,594 | B2* | 3/2011 | Reding | H04L 51/48 |
| | | | | 709/224 |
| 2014/0274362 | A1* | 9/2014 | Dhawan | A63F 13/798 |
| | | | | 463/29 |

(Continued)

FOREIGN PATENT DOCUMENTS

| JP | 2002202943 A | 7/2002 |
| JP | 2004145745 A | 5/2004 |
| JP | 2014209321 A | 11/2014 |

OTHER PUBLICATIONS

International Preliminary Report on Patentability and Written Opinion for corresponding PCT Application No. PCT/JP2020/001344, 16 pages, dated Aug. 5, 2021.

(Continued)

*Primary Examiner* — Omkar A Deodhar
(74) *Attorney, Agent, or Firm* — Matthew B. Dernier, Esq.

(57) ABSTRACT

Candidates of pieces of notification information determined in advance are acquired, and a list of the acquired candidates of the pieces of notification information is presented to a user at a predetermined timing. Another information processing device is notified of information based on a piece of notification information selected by the user from the list. Here, the predetermined timing described above includes a timing that is prior to execution of a predetermined application.

6 Claims, 4 Drawing Sheets

(56) References Cited

U.S. PATENT DOCUMENTS

2016/0001187 A1\* 1/2016 Sepulveda .............. A63F 13/49
463/31
2016/0008720 A1 1/2016 Inukai
2018/0352071 A1\* 12/2018 Karunamuni ....... H04M 1/7243

OTHER PUBLICATIONS

Notification of Reasons for Refusal for corresponding JP Application No. 2020-568107, 8 pages, dated Jul. 12, 2022.
Mobile Suit Gundam . . . ON, "extreme/acmb" https://gundam/vs.jp/extreme/acmb-on/news/2016/07/20/40/, 2 pages, dated Jul. 25, 2016 (See non-Pat Lit. #1).
International Search Report for corresponding PCT Application No. PCT/JP2020/001344, 7 pages, dated Mar. 17, 2020.

\* cited by examiner

INFORMATION PROCESSING SYSTEM AND INFORMATION PROCESSING DEVICE

TECHNICAL FIELD

The present invention relates to an information processing system and an information processing device.

BACKGROUND ART

An information processing device such as a home game console connected to a network and capable of exchanging a message between players through the network has become popular.

Some information processing devices described above have, for example, a function of sending a message to another information processing device which is used by another player who is playing the same game as a user of the information processing device while the user is executing a game application, that is, during the gameplay.

SUMMARY

Technical Problems

However, there is a need to interrupt an operation of the game in order to enter a text for a message during the gameplay. Also, in the conventional information processing device described above, during execution of a game application, it is not assumed that the user receives a message from a user who plays another game application different from the game application. Thus, the conventional information processing device is not configured to be able to flexibly exchange notification.

The present invention has been made in view of such circumstance described above, and it is an object of the present invention to provide an information processing system and an information processing device which are capable of flexibly exchanging notification.

Solution to Problems

One aspect of the present invention which solves the problems in the conventional example described above is an information processing device that is communicatably connected to another information processing device. The information processing device includes acquisition means configured to acquire candidates of pieces of notification information determined in advance, list presentation means configured to present a list of the acquired candidates of the pieces of notification information to a user at a predetermined timing, and notification means configured to notify the another information processing device of information based on a piece of notification information selected by the user from the list. The list presentation means presents the list of the candidates of the pieces of notification information to the user with a timing that is prior to execution of a predetermined application as the predetermined timing.

Advantageous Effect of Invention

According to the present invention, it is possible to exchange notification flexibly.

DESCRIPTION OF EMBODIMENT

Figure 1:
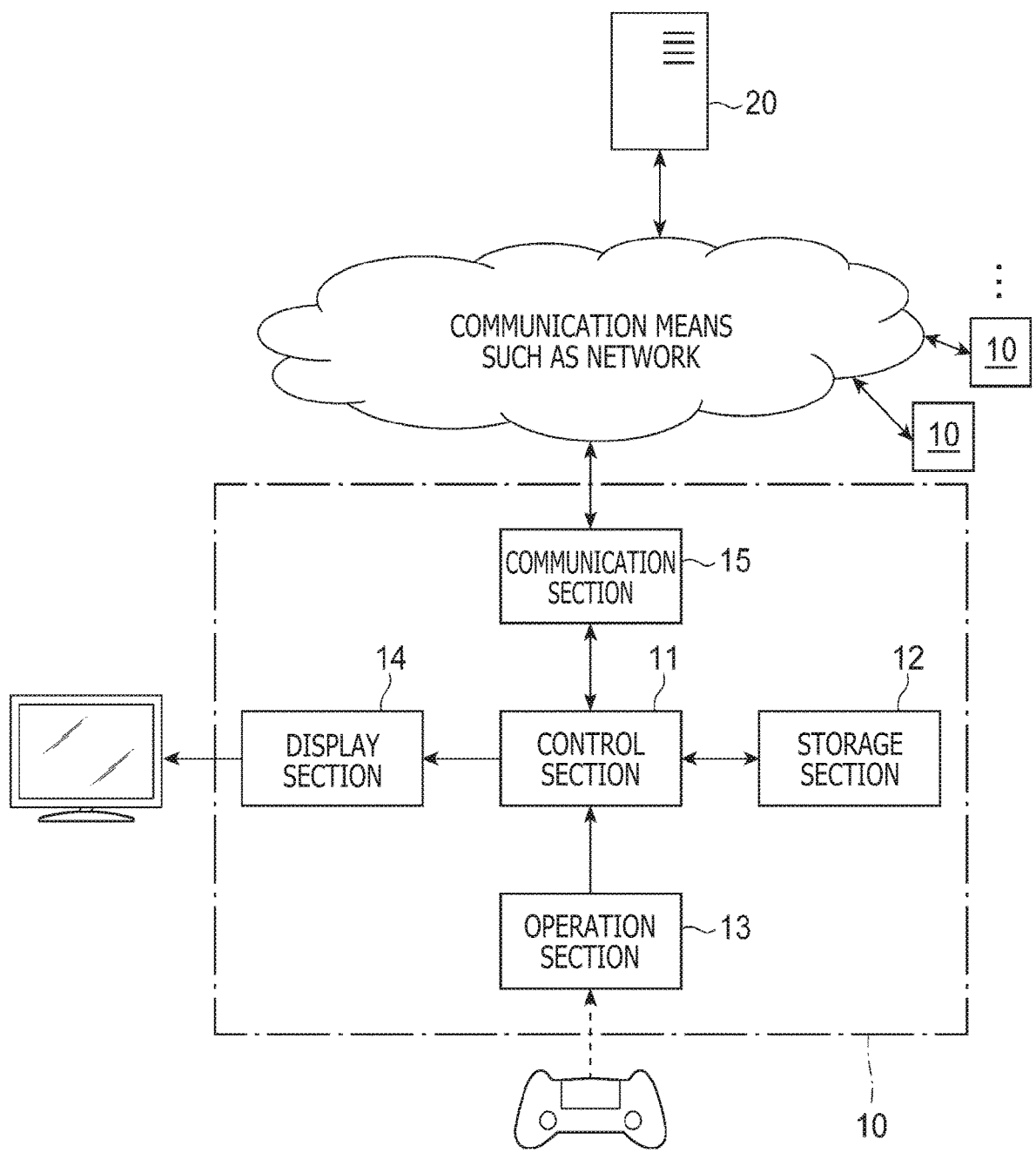
FIG. 1 is a block diagram depicting a configuration example of an information processing system according to an embodiment of the present invention.

An embodiment of the present invention will be described with reference to the drawings. As depicted in FIG. 1, an information processing system 1 according to the embodiment of the present invention includes a plurality of information processing devices 10 and a server 20. In such a case, each information processing device 10 and the server 20 are connected with each other through a network so as to be able to communicate with each other, and the information processing devices 10 can communicate with each other through the server 20.

The information processing device 10 is, for example, a home game console and includes a control section 11, a storage section 12, an operation section 13, a display section 14, and a communication section 15. In the following, this information processing device 10 is assumed to be a home game console for convenience of explanation; however, the information processing device 10 of the present embodiment is not limited to the home game console.

The control section 11 of the information processing device 10 is a program control device such as a CPU (central processing unit) and operates according to a program stored in the storage section 12. For example, this control section 11 executes a game application.

Also, this control section 11 acquires candidates of predetermined messages (corresponding to notification information in the present invention), presents a list of the acquired candidates of the messages to a user at a predetermined timing, and notifies another information processing device 10 different from the information processing device 10 (referred to as an own device, hereinafter) including the control section 11 itself, of information based on a message selected from this list by the user. Also, this control section 11 receives notification from another information processing device 10 different form the own device and presents information based on the message to the user, irrespective of whether or not an application program (hereinafter simply referred to as an application) is executed at that point of time. Note that presentation of the list may be carried out before a timing at which a predetermined application is executed.

The storage section 12 retains a program executed by the control section 11. This program may be stored in a computer-readable and non-transitory storage medium to be provided, and may be stored in this storage section 12. Also, this storage section 12 operates as a working memory of the control section 11.

The operation section 13 receives an input of an operation from a controller and outputs contents of the operation to the control section 11. The display section 14 outputs a signal by which an image is displayed according to an instruction input from the control section 11, to a display device such as a display.

The communication section 15 is a network interface or the like and sends information to a designated destination through the network according to an instruction input from the control section 11. Also, this communication section 15 receives information through the network and outputs the information to the control section 11.

The server 20 is a common server computer and operates according to a program installed therein. The server 20 of the present embodiment manages whether or not each user uses his/her information processing device 10. In particular, in an example of the present embodiment, the information processing device 10 sends, to the server 20, information identifying a user and authentication information such as a password which have been set in advance, for example, at a time of activation of the information processing device 10 to login, and operates so as to be able to communicate with the server 20. Such authentication process by the server 20 can adopt a widely known process.

This server 20 accepts, from the information processing device 10 which has come into a communicatable state (the user has logged in), a registration request for environment setting information such as a language used by the user or for information identifying a user who is a destination of a notification such as a message. In the following, a user who is a destination of a notification such as a message is called a friend, and information identifying this user is called friend identification information. Also, in a case in which a user who is a friend identified by friend identification information is distinguished from other users, this user who is a friend is called a friend user.

The server 20 retains the information identifying the user of the information processing device 10 which has made the registration request, as a user database, in association with the environment setting information such as a language used by the user and the information identifying a user who is a destination of a notification such as a message, the environment setting information and the information identifying the user being included in the registration request.

Also, when this server 20 accepts a notification request for a message from the information processing device 10 used by the user (registered user) identified by the information recorded in the user database, the server 20 references the friend identification information associated with the information identifying the user and notifies the information processing device 10 used by the friend user who has logged in among the friend users identified by the friend identification information, of a message.

Moreover, the server 20 associates the message relating to the notification request with the information identifying the user (user who is a sender of the message) of the information processing device 10 which is a sender of the notification request of the message, and retains the information relating to the notification request of the message by use of a method by which an order of sending messages can be identified (for example, in a sending order). The information retained here may include not only contents of the message but also an image of an avatar of the user who is the sender of the message, other additional pieces of information, or the like.

Then, when there is an information processing device 10 from which the server 20 has received a request of logout or for which a period of time in which the server 20 has not received data has exceeded a predetermined period of time (an information processing device 10 which has satisfied a predetermined condition set as a session timeout condition), the server 20 may delete information regarding the message associated with the information identifying the user of the information processing device 10.

The server 20 accepts a login request of the user from the information processing device 10 to execute an authentication process. When the server 20 permits login of the user here, the server 20 acquires the friend identification information identifying the friend user who is a friend of the user who has been permitted to log in, with reference to the user database, and checks whether or not there is information regarding a message associated with the friend identification information (user identification information identifying the friend user). When there is the information regarding the message here, the server 20 notifies, on the basis of the information regarding the message, the information processing device 10 used by the user who has logged in, of the message. Note that, when a plurality of pieces of information regarding messages are recorded, the server 20 may be configured to send notification based on information regarding the latest message. Accordingly, when a certain user logs in, a status of another user who is a friend of the user is notified.

At this time, the server 20 may send the notification of the message by acquiring the information regarding a language set as a language used by the friend user identified by the friend identification information, with reference to the user database, acquiring information regarding a translation message obtained by translating the message to be an object of the notification request, into the language identified by the information, and then sending the translation message thus acquired to the information processing device 10 used by the friend user identified by the friend identification information.

Note that this translation may be made by machine translation. Also, the messages are stored in advance in the storage section 12 in an example of the present embodiment. In view of this, the messages prepared in advance may be stored in such a manner that the messages have been translated in different languages and that the messages in different languages are associated with each other. In such a case, the server 20 reads out a translation message which is associated with a message to be an object of the notification request and which corresponds to the language used by the user identified by the friend identification information, and sends the read translation message to the information processing device 1 used by the friend user identified by the friend identification information.

Also, when the friend user of the user who has logged in (referred to as a user to be notified) operates his/her information processing device 10 and carries out a predetermined operation such as a login operation or activation of a game application, this server 20 notifies the user who is the user to be notified, of the message of the operation (system message).

Figure 2:
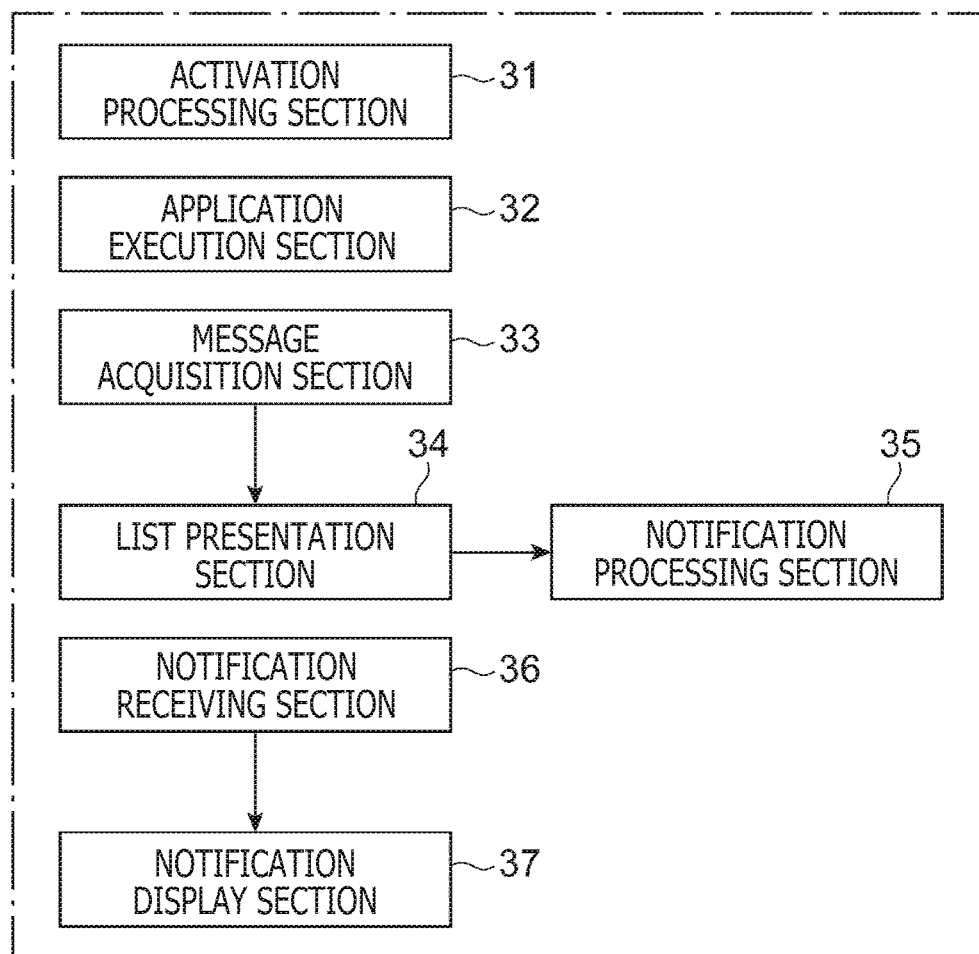
FIG. 2 is a functional block diagram depicting an example of an information processing device according to the embodiment of the present invention.

Now, an operation of the control section 11 of the information processing device 10 according to the embodiment of the present invention. will be described. As depicted in FIG. 2, the control section 11 of the present embodiment functionally includes an activation processing section 31, an application execution section 32, a message acquisition section 33, a list presentation section 34, a notification processing section 35, a notification receiving section 36, and a notification display section 37.

The activation processing section 31 displays a list of applications installed in the storage section 12, facilitating selection of the user. Also, this activation processing section 31 starts executing an application selected by the user (activation process).

The application execution section 32 executes a process such as a game application activated by the activation processing section 31. Specifically, the game application executed by this application execution section 32 exchanges parameter information regarding the game with another information processing device 10 through the server 20, for example, and may execute a process as a game application by using the exchanged parameter information. Such a process of the game application is similar to a process widely known as a process of a network game, and accordingly, a detailed description thereof will be omitted here. In an example of the present embodiment, such a process through the server 20 described above makes it possible to realize a cooperative play by multiple users for achieving a goal of one game.

The message acquisition section 33 acquires, for example, the candidates of the predetermined messages stored in the storage section 12. Specifically, the candidates of the messages correspond to a list of examples of messages relating to announcement of start of a game, a request for support (of a game), and the like. As an example of the present embodiment, the candidates of the messages are stored in the storage section 12 in association with information identifying a timing at which the candidates are presented.

Moreover, as an example of the present embodiment, each candidate of a message may be associated with situational expression information represented by the corresponding candidate, as an example of additional information. This situational expression information may be, for example, a text such as "smile" or "trying" or may be image data such as an icon. For example, in a case in which the candidate of the message is "this scene is difficult!" the candidate of the message may be associated with the situational expression information representing "trying."

When a predetermined timing has come, the message acquisition section 33 of the present embodiment acquires a list of candidates of messages associated with information identifying the timing. Specifically, this timing is determined in advance as a timing of starting execution of an application, a timing of executing the application, or the like.

The list presentation section 34 presents the user with the list of the candidates of the messages acquired by the message acquisition section 33, at the predetermined timing described above, facilitating selection of the user.

When the user selects a message from the candidates of the messages presented by the list presentation section 34, the notification processing section 35 sends information identifying the selected message to the server 20.

The notification receiving section 36 receives the message from the server 20 (in a case in which the situational expression information is associated with the message, the message may include the situational expression information) and outputs the message to the notification display section 37. When the notification display section 37 receives an input of the message from the notification receiving section 36, irrespective of whether or not the application is executed, the notification display section 37 outputs and displays the message (and the situational expression information) (or to make a sound as audio), presenting the message to the user.

[Operation] The present embodiment includes the above-described configuration as basic components and operates in the following manner. In the description below, it is assumed that a user A (used language: Japanese) registers a user B (used language: English) and a user C (used language: Japanese) as friends.

Also, in the information processing device 10 of the user A, game applications α and β are installed, and as candidates of messages to be presented before activation of the game application, an identifier of a message set uniquely to each message and contents of the message are stored in association with information identifying the timing that is prior to the activation of the game application. Specifically, in the storage section 12 of the information processing device 10, in association with information identifying the timing that is prior to the activation of the application, the following pieces of information are stored, for example.
(M1) "I'll start live stream of [application name]"
(M2) "Let's play [application name] together"
Here, "Mx" (x is a sequential number of natural numbers) is an example of the identifier of the message.

Also, in the storage section 12 of the information processing device 10, as the candidates of the messages to be presented during execution of the game application, in association with information identifying the timing that is during execution of the game application, it is assumed that the following pieces of information are stored, for example.
(M3) "Let's play [application name] together"
(M4) "Help from [application name]!"
(M5) "I'm playing [application name]. I feel like a solo play today!"
(M6) "I'll quit [application name]"
Note that "[application name]" among the texts indicates portions which can be replaced with an application name that the user attempts to activate or an application name that the user is executing, by the information processing device 10.

Also, it is assumed that the server 20 stores these candidates of the messages and translation messages corresponding to the application name and translated into different languages such as English or Chinese.

In other words, the server 20 retains predetermined texts of the messages in different languages with respect to the identifier of the message. Specifically, the server 20 retains the text of the message "Let's play [application name] together" in different languages (Japanese, English, Chinese, and so forth) so as to have the text correspond to the identifier (M2) of the message.

Also, it is assumed that this server 20 stores the text in different languages, the text corresponding also to a name of an application that can be installed into the information processing device 10. Specifically, the server 20 retains the text in different languages, the text corresponding to a common game title, in association with each other. Also, this name of the application may be retained in the server 20 while further being associated with image information regarding an application icon.

Figure 3:
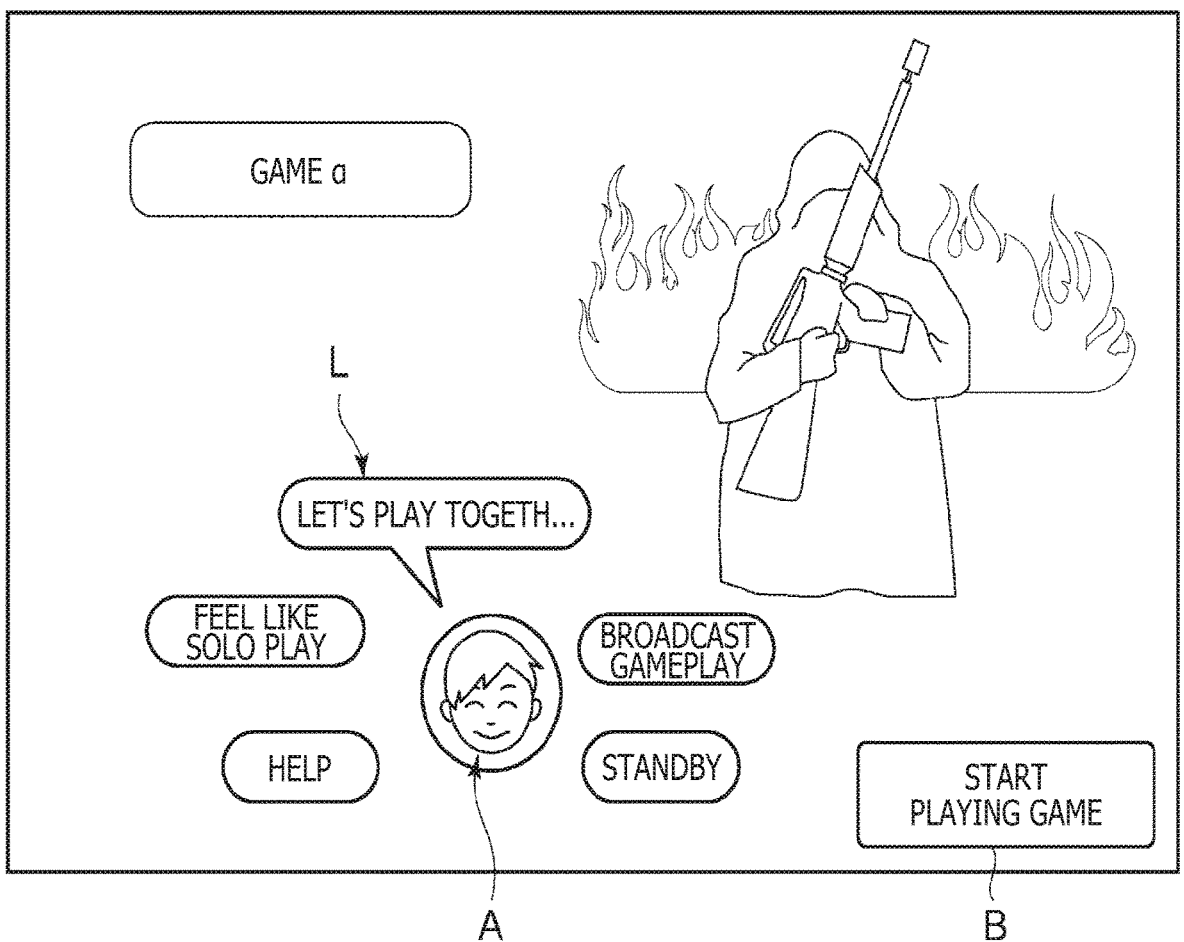
FIG. 3 is an explanatory view depicting an example of a list of messages presented by the information processing device according to the embodiment of the present invention.

Now, when the user A activates the information processing device 10 and logs in the server 20 and then carries out an operation to activate the game application α, the information processing device 10 determines that a timing for presenting the candidates of the messages set in advance has come, and presents the list of the candidates of the messages associated with the information identifying the timing (timing that is prior to the activation of the game application) (FIG. 3).

FIG. 3 depict an example of a state in which a list (L) of the candidates of the messages is presented on the periphery of an avatar of the user A (which is a profile image set by the user and retained in association with the information identifying the user in each of the information processing device 10 and the server 20) before starting a session at a time at which an instruction has been given to activate the game application α. Also, it is assumed that a button (B) for giving an instruction to start the game (activate the application) is displayed on this screen and that, when this button is operated, the information processing device 10 starts a process of the game application.

When the user A selects a message from these candidates presented, the information processing device 10 sends a notification request for the message including the information identifying the user A and the information (identifier of the message) identifying the message selected by the user A, to the server 20. At this time, the information processing device 10 sends the notification request for the message in addition to the text "game α" representing the name of the application α that the user attempts to activate.

When receiving the notification request for the message from the information processing device 10, the server 20 acquires respective pieces of information identifying the users B and C who are registered by the user A identified by the information included in the notification request as friends of the user A. Then, the server 20 refers to the language used by each of the users B and C who are friends and are identified by the acquired information. Then, regarding the user B (used language: English), the server 20 acquires the translation message in English corresponding to the message relating to the notification request received from the information processing device 10 used by the user A.

Specifically, in a case in which the user A has selected the message "Let's play [application name] together," the server 20 receives the identifier "M2" of this message and the application name "game α" from the information processing device 10.

Since the used language of the user B is English, the server 20 acquires the English text of the message corresponding to the identifier "M2" of this message and the English text corresponding to the application name and generates the English text of the message "Let's play the game α together" which should be sent to the user B. Then, the server 20 sends the English translation message thus generated to the information processing device 10 of the user B who is a friend of the user A and sets English as the used language, in addition to the information identifying the user A who is a sender of the message.

On the other hand, since the user C who is a friend of the user A sets Japanese as the used language, the server 20 acquires the Japanese text of the message retained in association with the identifier of the message sent by the user A and the Japanese game title of the "game α," from the information retained therein. Then, the server 20 generates the Japanese text of the message "Let's play the game α together" to the user C.

Then, the server 20 sends the message thus generated in addition o the information identifying the user A who is a sender of the message, to the information processing device 10 used by the user C.

Also, in an example of the present embodiment, when the server 20 receives the application name associated with the message along with the notification request for the message, the server 20 may acquire an image of an icon of the application associated with the application name and an avatar of a user who is a sender of the message, and may send at least one of these images along with the message to a destination of the message.

The information processing device 10 of the user B outputs and displays the message received from the server 20, along with the information identifying the user A who is a sender of the message. At this time, no matter what kind of application the user B who has received the message is executing (even if the user B is executing the game application different from the game application that the user A is playing), the message of the user A is displayed on the game screen of the user B.

Figure 4:
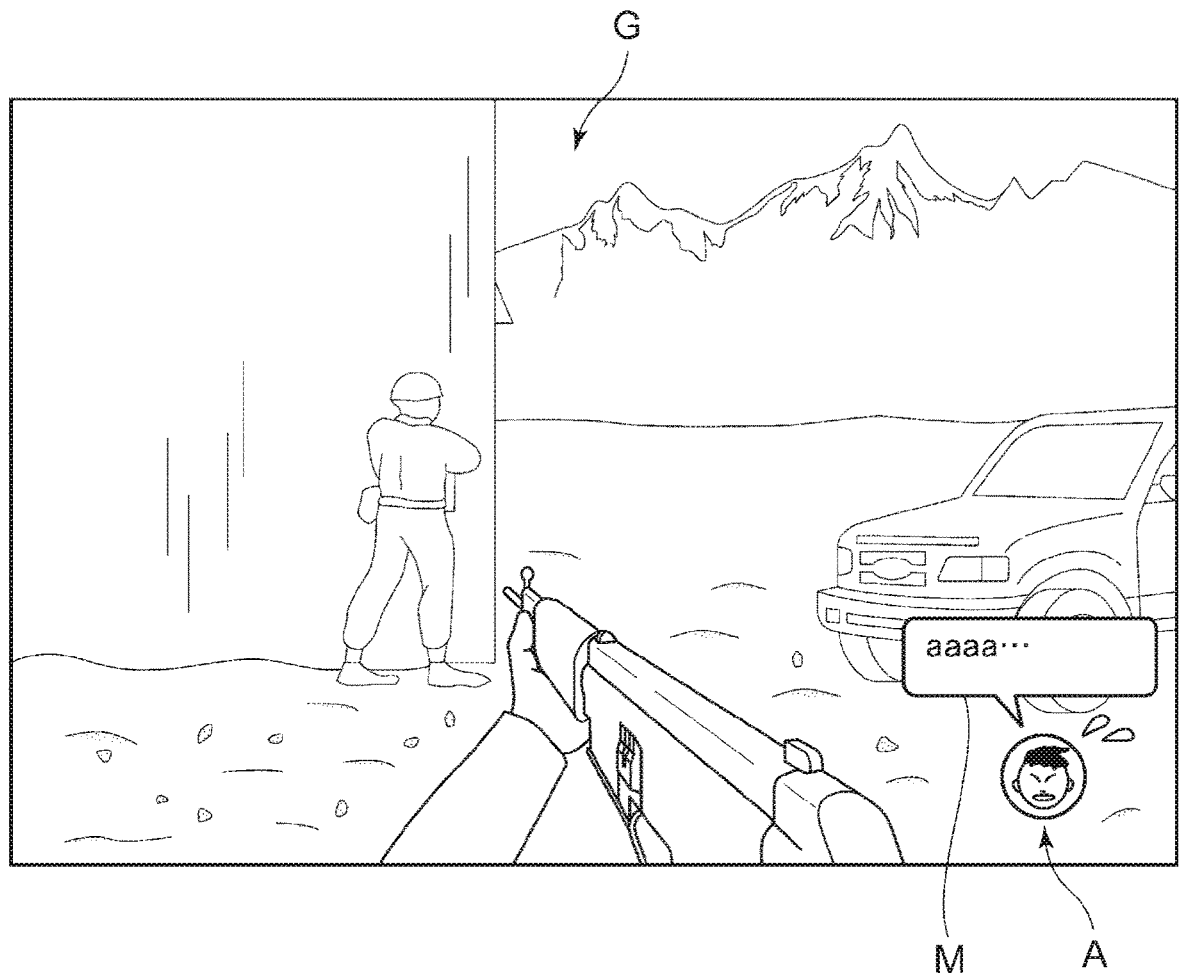
FIG. 4 is an explanatory view depicting an example of notification of a message presented by the information processing device according to the embodiment of the present invention.

Specifically, when receiving the avatar of the user from the server 20, the information processing device 10 displays the message and the image of the avatar at a predetermined position of the screen during execution of the game application, as depicted in FIG. 4. As has been described above, this display is carried out even if the user B activates and plays a game application γ different from the game which the user A is playing, for example.

In an example of FIG. 4, within a screen (G) of the game played by the user of the information processing device 10, along with an avatar (A) of the user, a message (M) is displayed in a balloon. As a matter of course, a display mode of a message in the present embodiment is not limited to this.

Also, a position of the message or the like on this game screen may be fixed on an upper left corner of the screen or the like, for example, and the information processing device 10 may control the display position of the message or the like depending on a situation of the game. For example, the information processing device 10 may execute, as a process of the game application, a process of deciding the display position of the message or the like. In such an example, the game application enables display of the message or the like at a location at which progress of the game is less likely to be disturbed while taking into consideration display on the game screen by itself.

Also, an avatar set h the user and retained in association with the information identifying the user is not limited to one kind. The server 20 may make kinds of avatar to be acquired different depending on contents of a message to be sent.

Specifically, the server 20 may store the avatar in advance for each piece of situational expression information which may be associated with candidates of messages. For example, when the situational expression information is "smile," the avatar adopts a smiling avatar, and when situational expression information is "trying," the avatar is associated with one with a troubled sweating face (an image of the avatar may be a moving image) in advance.

Then, the server 20 acquires situational expression information associated with the candidate of the message selected by the user and acquires information corresponding to the situational expression information and regarding an avatar of the user who is a sender of the message, to send the acquired information regarding the avatar along with the message to the information processing device 10. Accordingly, for example, if the situational expression information "smile" is associated with the candidate of the message "Let's play [application name] together," the server 20 acquires the "smile" avatar of the user A here, and accordingly, the acquired avatar is sent to the information processing device 10.

In such an example, it is assumed that the image of the avatar is set in advance according to (at least some pieces of) situational expression information to be possibly sent.

Then, the information processing device 10 receives and displays the message along with the smile avatar of the user A.

Accordingly, the message sent from the user A is displayed for the user B as the English translation message which corresponds to the used language of the user B, and the user B receives the English text of the message "Let's play game α together" along with the avatar of the user A.

Also, the information processing device 10 of the user C outputs and displays the Japanese text of the message "Let's play game α together" received from the server 20, along with the information identifying the user A who is a sender of the message. At this time, even if the user C activates another application, for example, this display is carried out.

Thereafter, similarly in a case in which the user A carries out a predetermined operation designated for notifying a friend of a message while executing the game application α, the information processing device 10 determines that a timing for presenting the candidates of messages set in advance has come, and presents a list of the candidates of messages associated with the information identifying the timing (timing at which the game application is executed).

Specifically, in an example here, a list of the candidates of the following messages is presented to the user A.
(M3) "Let's play [application name] together"
(M4) "I'm playing [application name]. I need help!"
(M5) "I'm playing [application name]. I feel like a solo play today!"
(M6) "I'll quit [application name]"

Here, when the user A selects the message "I'm playing [application name]. I need help!" the information processing device 10 sends a notification request for a message including the identifier (M4) of the message identifying the selected message and an application name being executed, to the server 20.

The server 20 acquires information identifying the users B and C who are registered as friends of the user A, and references the language to be used by each of the users. Then, for the user B (used language: English), the server 20 acquires the English translation message corresponding to the message relating to the notification request received from the information processing device 10 used by the user A.

Specifically, the server 20 acquires the application name and the English translation message corresponding to the message relating to the notification request and generates the English text of the message "I'm playing the game α. I need help!" Then, the server 20 sends the English text of the message thus generated, along with the information identifying the user A who is a sender of the message, to the information processing device 10 of the user B who is a friend of the user A and sets English as the used language.

On the other hand, since the user C who is a friend of the user A sets the used language to Japanese, the server 20 acquires the Japanese application name and the Japanese text of the message corresponding to the message identifier sent by the user A and generates the Japanese text of the message "I'm playing the game α. I need help!" The server 20 sends the generated message along with the information identifying the user A who is a sender of the message, to the information processing device 10 used by the user C.

Then, the information processing device 10 of the user B outputs and displays the translation message received from the server 20, along with the information identifying the user A who is a sender of the message.

Also, the information processing device 10 of the user C outputs and displays the Japanese text of the message received from the server 20, along with the information identifying the user A who is a sender of the message.

According to the present embodiment, the user A activates and executes the game application α. Even if the users B and C who are friends of the user A each activate and execute another application, the message regarding the game application α and sent by the user A is α displayed on a screen of the application being executed by the information processing device 10 of each of the users B and C, so that, irrespective of an execution state of the application of each of the users B and C, the message relating to the game application α can be received from the user A.

[Generation of Message Candidates by Application] Also, in the description so far, it has been assumed that the candidates of the messages are not related to an application and are preliminarily stored in the storage section 12 of the information processing device 10; however, the present embodiment is not limited to this.

For example, the information processing device 10 may accept the candidates of the messages from an application being executed. Specifically, for example, when a user executes an operation of repetitively challenging the same scene a predetermined number of times or more, a game application may control the information processing device 10 such that the following message candidate is presented as a candidate of a message for being presented at this timing. "This scene X is hard. I need help!"

In such a case, when a selection is made by the user to notify a friend of the user of the candidate of the message presented, the information processing device 10 sends the message and the name of the application being executed to the server 20, and the server 20 sends the message to the friend of this user.

[Generation of Translation Message] Note that the server 20 may use a machine translation process in order to acquire a translation message corresponding to a message selected by the user of the information processing device 10. As for the machine translation process, a well-known process such as a process using another machine translation server can be used, and accordingly, a detailed description thereof will be omitted here. Employing such a machine translation process makes it possible to acquire a corresponding translation message also in a case in which a message candidate is not any one of messages which have been prepared in the information processing system 1, such as a case in which a message candidate is a message prepared by the application as described above.

[Message Candidate] Also, in the description so far, it has been assumed that the candidates of the messages to be presented to a user have been stored in the storage section 12 of the information processing device 10; however, the present embodiment is not limited to this, and the information processing device 10 may acquire the candidates of the messages from the server 20.

In such an example, the server 20 retains identifiers of the messages uniquely assigned for each message and texts of messages in different languages determined in advance, in association with the information identifying the timing of presenting the candidates.

Also, the information processing device 10 in such an example retains the information identifying the timing of presenting the candidates, in the storage section 12 in advance, and when the timing identified by the information has come, the information processing device 10 sends a request for a text of the message corresponding to the used language of the user of the information processing device 10, among the messages associated with the information identifying the timing, to the server 20.

Specifically, as has been described, the timing mentioned here includes a timing of activating the application. When the user carries out an operation for activating the application, in response to the operation, the information processing device 10 determines that the timing for activation of the application has come, and sends, to the server 20, a request for the text of the message corresponding to the used language of the user of the information processing device 10, the message being associated with the information identifying the timing.

The server 20 responds to the request received from the information processing device 10 and acquires the information identifying the user of the information processing device 10 who has made the request. Then, the server 20 acquires the information identifying the used language of the user identified by the acquired information, from a user database. Moreover, the server 20 sends, from among the texts of the messages which are associated with the information identifying the timing and which are included in the received request, the text of the candidate of the message corresponding to the used language identified by the acquired information (a plurality of kinds of messages may be present as the candidates) and the identifier of the message, to the information processing device 10 which has made the request.

Then, the information processing device 10 receives the candidates of the messages and the corresponding identifiers of the messages from the server 20, stores them in association with each other, and also presents a list of the candidates of the messages received. Since the following process is similar to the example which has been described above, repetitive description is omitted.

[Management of Activation State of Application] Moreover, this server 20 may manage an application which is activated by each user. In such an example, when the user activates an application, the information processing device 10 notifies the server 20 of information identifying the activated application, and the server 20 associates the information identifying the user of the information processing device 10 which has given the notification, with the notified information identifying the application, to retain the information.

Also, when execution of an application is interrupted or terminated by the user, the information processing device 10 notifies the server 20 of information indicating that the execution of the application is interrupted or terminated.

Then, when the server 20 receives the notification of the interruption of the execution of the application, the server 20 associates and retains the information representing the interruption of the execution of the application, as information representing a state of execution of the application and associated with the information identifying the user of the information processing device 10 which has given the notification.

Also, when the server 20 receives the notification indicating that the application has been terminated, the server 20 deletes the information identifying the application associated with the information identifying the user of the information processing device 10 which has given the notification.

[Notification Condition of Message] Moreover, in an example of the present embodiment, a condition of notification may be set for each message. For example, conditions for giving notification may be set for each candidate of message retained in the information processing device 10 or the server 20. The conditions for giving notification may include, for example, only a friend who is logging in currently;
only a friend who has logged in within 30 minutes of the notification request;
only a friend who is activating the game application α at the time of the notification request; and
only a friend who has logged in before the user who has made the notification request terminates the application executed upon the notification request.

In such a case, when the server 20 receives the notification request of the message including the notification condition set such that "only a friend who is logging in currently" is to be notified, for example, the server 20 acquires the information identifying the user who is a friend of the user of the information processing device 10 which has made the notification request, and executes a process of giving notification of the message to only the information processing device 10 of the user who has logged in at a point of time of this process, among users identified by the acquired information.

Also, in a case in which a time period from the notification request is set, the server 20 records time at which the notification request has been received, along with the notification request (since date and time information can be acquired by a well-known method, a detailed description. is omitted here), and may execute the process of giving notification of a message under a condition according to the set time on the basis of the record.

According to such an example, for example, if a condition "only a friend who has logged in before the user who has made the notification request terminates the application executed upon the notification request" is set in advance to a message "Let's play the game α together," when the user A sends the notification request to the server 20 so as to notify the friend of this message upon activation of the game application α, the server 20 (the server 20 in such a case is assumed to manage an activation state of an application, as has been described above) executes the process of giving notification of this message described above only to the information processing device 10 of the friend who is the friend of the user A and who has logged in within a period from reception of this notification request by the server 20 to reception, by the server 20, of the notification of termination of the game application a from the information processing device 10 of the user A.

Hence, a situation in which the message "Let's play together" is sent to the friend of the user A although the user A has already terminated the game α can be prevented from occurring.

REFERENCE SIGNS LIST

1: Information processing system
10: Information processing device
11: Control section
12: Storage section
13: Operation section
14: Display section
15: Communication section
20: Server
31: Activation processing section
32: Application execution section
33: Message acquisition section
34: List presentation section
35: Notification processing section
36: Notification receiving section
37: Notification display section

The invention claimed is:

1. An information processing device that is communicatably connected to another information processing device, the information processing device comprising:
a storage unit configured to store, in advance of execution of an application program to be executed on the information processing device by a user, and in association with one another: (i) a plurality of predetermined reply message candidates, (ii) a respective identifier for each of the plurality of predetermined reply message candidates, and (iii) respective timing information identifying respective predetermined timing at which one or more of the plurality of predetermined reply message candidates are available for presentation to the user with regard to whether or not the application program has begun execution on the information processing device;

an acquisition unit configured to acquire one or more of the plurality of reply message candidates from the storage unit;

a list presentation unit configured to display a list of the acquired one or more of the plurality of reply message candidates to the user of the information processing device at a predetermined timing based on the with respective timing information, and to permit the user to select from among the plurality of reply message candidates; and a notification unit configured to notify another user of the another information processing device of information based on a selected one of the one or more of the plurality of reply message candidates by the user from the list, wherein the notification unit refers to information of a language used by the another user based on a location destination of the another user and notifies the another information processing apparatus of the another user of a translated version of the selected one of the one or more of the plurality of reply message candidates based on the information of the language used by the another user.

2. The information processing device according to claim 1, wherein the list presentation unit presents the list of the one or more of the plurality of reply message candidates to the user with a timing that is prior to execution of the application program on the information processing device as the predetermined timing.

3. The information processing device according to claim 1, wherein the list presentation unit presents the list of the one or more of the plurality of reply message candidates to the user at the predetermined timing that is during execution of the application program on the information processing device.

4. The information processing device according to claim 3, wherein the acquisition unit acquires the one or more of the plurality of reply message candidates on a basis of a state of execution of the application program during the execution of the application program on the information processing device.

5. An information processing device that is communicatably connected to another information processing device, the information processing device comprising:

receiving unit configured to receive notification information that is sent by the another information processing device; and display unit configured to display contents of the received notification information, wherein the notification information is produced by the another information processing device by:

providing a storage unit configured to store, in advance of execution of an application program to be executed on the another information processing device by a user, and in association with one another: (i) a plurality of predetermined reply message candidates, (ii) a respective identifier for each of the plurality of predetermined reply message candidates, and (iii) respective timing information identifying respective predetermined timing at which one or more of the plurality of predetermined reply message candidates are available for presentation to the user with regard to whether or not the application program has begun execution on the another information processing device;

providing an acquisition unit configured to acquire one or more of the plurality of reply message candidates from the storage unit;

providing a list presentation unit configured to display a list of the acquired one or more of the plurality of reply message candidates to the user of the another information processing device at a predetermined timing based on the with respective timing information, and to permit the user to select from among the plurality of reply message candidates;

providing a notification unit configured to send the notification information to the information processing device based on a selected one of the one or more of the plurality of reply message candidates by the user from the list; and where the notification unit refers to information of a language used by the user of the information processing device based on a location destination of the user and notifies the information processing apparatus of the user of a translated version of the selected one of the one or more of the plurality of reply message candidates based on the information of the language used by the user, and wherein the display unit displays the contents of the received notification information even when the information processing device is executing an application different from the application that is yet to be executed or is being executed by the another information processing device at a timing at which the another information processing device that is a sender of the notification information sends the notification information.

6. An information processing system including an information processing device and another information processing device communicatably connected to one another, the information processing device, comprising:

a storage unit configured to store, in advance of execution of an application program to be executed on the information processing device by a user, and in association with one another: (i) a plurality of predetermined reply message candidates, (ii) a respective identifier for each of the plurality of predetermined reply message candidates, and (iii) respective timing information identifying respective predetermined timing at which one or more of the plurality of predetermined reply message candidates are available for presentation to the user with regard to whether or not the application program has begun execution on the information processing device;

an acquisition unit configured to acquire one or more of the plurality of reply message candidates from the storage unit;

a list presentation unit configured to display a list of the acquired one or more of the plurality of reply message candidates to the user of the information processing device at a predetermined timing based on the with respective timing information, and to permit the user to select from among the plurality of reply message candidates; and a notification unit configured to notify another user of the another information processing device of information based on a selected one of the one or more of the plurality of reply message candidates by the user from the list, wherein the notification unit refers to information of a language used by the another user based on a location destination of the another user and notifies the another information processing apparatus of the another user of a translated version of the selected one of the one or more of the plurality of reply message candidates based on the information of the language used by the another user.

* * * * *